Dec. 4, 1928.
D. M. BARDON
CABLE CONNECTING MEANS
Filed Feb. 28, 1927
1,694,051
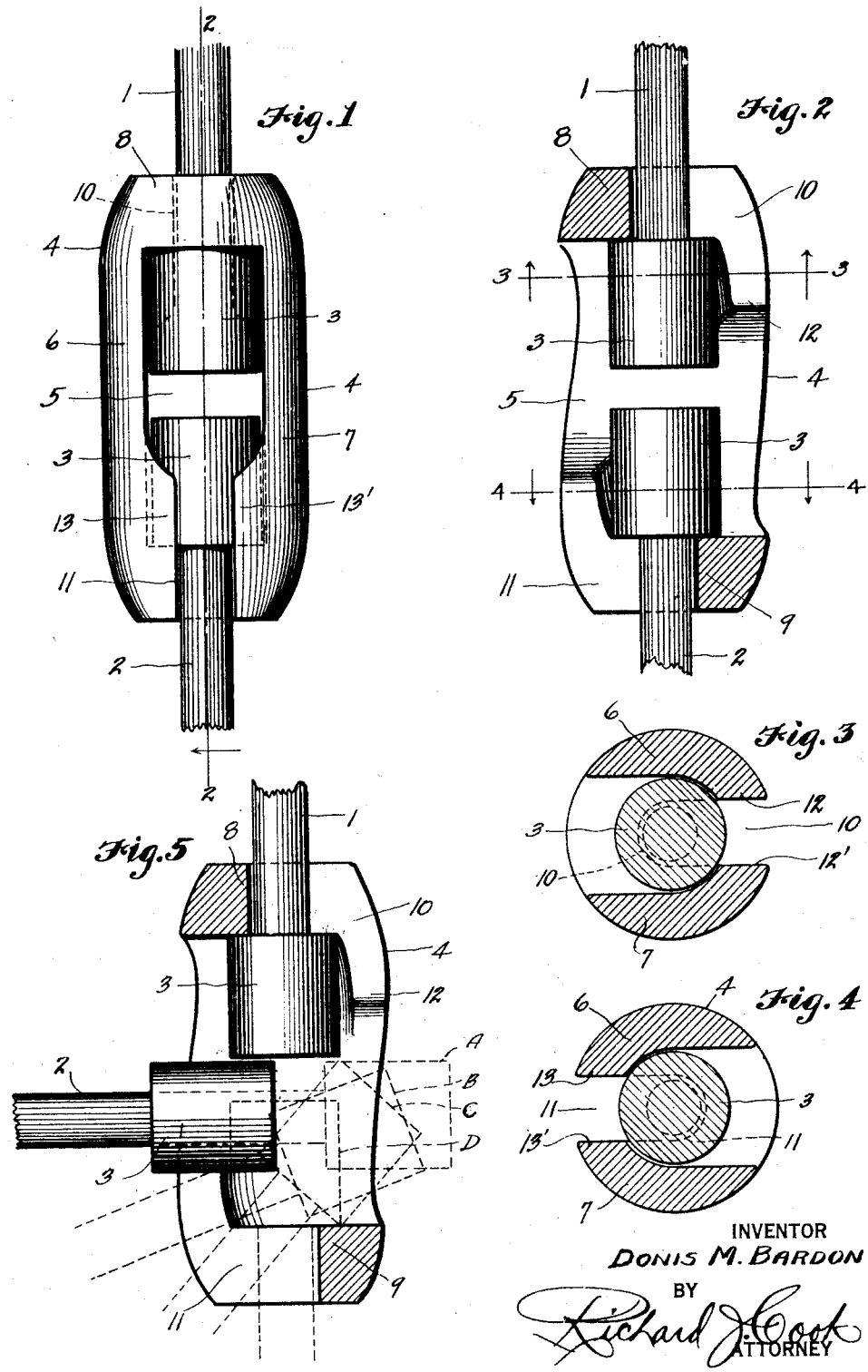
INVENTOR
DONIS M. BARDON
BY
Richard J. Cook
ATTORNEY Patented Dec. 4, 1928.

1,694,051

UNITED STATES PATENT OFFICE.

DONIS M. BARDON, OF SEATTLE, WASHINGTON.

CABLE-CONNECTING MEANS.

Application filed February 28, 1927. Serial No. 171,695.

This invention relates to cable connecting means, and more particularly to devices of that character especially adapted for joining the ends of cables used in logging operations such as connecting the choker line to the tag lines, or "haul-in" lines.

It is the principal object of the present invention to provide a connecting device to which either cable, or both, may be easily and quickly connected or from which either may be disconnected, but from which neither one may be disconnected so long as the device is functionally in use; that is so long as there is tension on the cables.

More specifically, the object of the invention resides in the provision of retaining enlargements, or thimbles, on the ends of cables to be connected and a link provided with seats at its ends, a central, transverse passage and cable receiving slots from said passage into the seats which permits the retaining enlargements to be disposed within the link against the seats in such manner as to connect the cables together, the said retaining enlargements being of such character that when in this position each serves as a retainer for the other to hold it seated and from being disconnected except by slackening the cables sufficiently to permit the enlargement to be turned sufficiently to be withdrawn endwise from the link through said central passage.

Other objects reside in the various details of construction and combination of parts as will hereinafter be described and set forth in the claim terminating the specification.

In accomplishing these objects, I have provided the improved forms of construction, the preferred forms of which are illustrated in the accompanying drawings, wherein—

Figure 1 is a side view of a cable connecting device embodied by the present invention, showing the ends of the cables joined thereby.

Figure 2 is a sectional view on the line 2—2 in Figure 1.

Figure 3 is a horizontal section taken on the line 3—3 in Figure 2.

Figure 4 is a horizontal section taken on the line 4—4 in Figure 2.

Figure 5 is a sectional view, illustrating the method of applying a cable to the connecting link.

Referring more in detail to the drawings—

1 and 2 respectively designate the ends of cables to be joined, each being equipped at its end with a cylindrical ferrule, or retaining enlargement, 3 which serves as the means for connecting the cable with a link, or block, 4. The link 4, preferably, is of forged metal substantially of cylindrical outline and slightly tapered at its ends so as to present an exterior surface that will not easily catch on brush or timber through which it may be drawn. It is provided intermediate its ends with a transverse passage 5 between the spaced apart side walls 6 and 7 and, in its opposite end walls 8 and 9, has laterally opening slots 10 and 11 respectively leading thereinto from opposite sides of the hook through its axial line and through which the ends of the cables 1 and 2 may be extended. When tension is placed on the cables the retaining enlargements, at their ends, will be seated flatly against the ends of the link as shown in Figure 2. The transverse passage 5 through the link is partly closed at opposite sides of the slot 10 by inwardly directed shoulders 12—12′ and, at the other end of the link, the passage is partially closed by shoulders 13—13′ at opposite sides of the slot 11. These shoulders are provided for the purpose of preventing lateral displacement from the link of the retaining enlargement when seated against the ends of the link; the retaining enlargements being of such diameter that they cannot pass laterally from the link between the shoulders. However, the cables attached to the enlargements may be swung laterally through the slots so as to permit the enlargements to be withdrawn endwise through the passage after they have been lifted above the shoulders.

The length of the ferruled enlargements is important, and it is to be observed by referring to Figures 1 and 2 that when the device is in use the ends of the enlargements are closely adjacent each other and this prevents the unseating and displacement of either from the link so long as their end to end relation is maintained. Either cable may be disconnected from the link by first slackening it sufficiently that it may be swung laterally within the slot and the ferruled end turned transversely with respect to the axial line of the link and then drawn out of the link endwise.

Assuming the device to be so constructed, it is used as follows:

To connect the cable 1 to the link, its ferruled enlargement is projected through the opening 2 from the right side of the link, assuming it to be positioned as shown in Figures 2 and 3, and the cable is swung upwardly between the shoulders 12—12′ and into the slot 10, and the inner end of the ferrule seated against the end of the link as shown in Figure 5. The ferruled end of the cable 2 is then projected through the opening from the other side of the link and advanced to the position as shown in dotted lines at A. The cable is then swung downwardly between the shoulders 13—13′ and into the slot 11 successively through the positions B, C and D, shown in dotted lines, to seat the end of the ferrule against the end wall of the link. So long as there is tension applied to the cables sufficient to retain the ferrules against turning transversely with respect to the axis of the link neither can be displaced for the reason that they will come in end abutment with each other before clearing the retaining shoulders.

Having thus described my invention, what I claim as new therein and desire to secure by Letters-Patent, is:

In combination, a pair of cables equipped with retaining ferrules at their ends, and a connecting link having a transverse passage in which said enlargements may be contained in end to end, interlocked relation, cable receiving slots extending into the end walls of the link from opposite sides thereof through the axial line and shoulders formed on the side walls of the link at opposite sides of the said slots to prevent lateral displacement of the retaining ferrules when seated; said ferrules being of such length that when in end to end relation neither may be removed from the link but either may be removed when its cable is swung laterally into its slots and the ferrule turned transversely to the axis of the link and then lifted clear of the retaining shoulders and withdrawn endwise.

Signed at Seattle, Washington, this 26th day of April 1926.

DONIS M. BARDON.